US006727801B1

(12) United States Patent
Gervasi et al.

(10) Patent No.: US 6,727,801 B1
(45) Date of Patent: Apr. 27, 2004

(54) LOCK BOX DEVICE

(76) Inventors: Richard Gervasi, 1322 Veronica La., Phoenixville, PA (US) 19460; Christina Gervasi, 1322 Veronica La., Phoenixville, PA (US) 19460

( * ) Notice: Subject to any disclaimer, the term of this patent is extended or adjusted under 35 U.S.C. 154(b) by 494 days.

(21) Appl. No.: 09/610,270

(22) Filed: Jul. 6, 2000

Related U.S. Application Data

(60) Provisional application No. 60/169,524, filed on Dec. 7, 1999, and provisional application No. 60/169,994, filed on Dec. 3, 1999.

(51) Int. Cl.[7] .............................................. B60R 25/00

(52) U.S. Cl. ...................... 340/5.73; 340/5.3; 340/5.61; 379/100.05; 70/63

(58) Field of Search ................................ 340/5.73, 5.1, 340/5.23, 5.3, 5.33, 5.61; 70/63; 109/59; 379/100.05, 100.06

(56) References Cited

U.S. PATENT DOCUMENTS 4,461,222 A * 7/1984 Brunner et al. ............... 109/29
4,594,637 A 6/1986 Falk
4,609,780 A * 9/1986 Clark ......................... 179/2 A
4,777,556 A 10/1988 Imran
4,800,255 A 1/1989 Imran
4,851,652 A 7/1989 Imran
4,864,115 A 9/1989 Imran et al.
4,908,606 A * 3/1990 Kevonian ................... 340/571
4,988,987 A * 1/1991 Barrett et al. ............ 340/825.3
5,531,344 A * 7/1996 Winner .......................... 222/1
5,794,808 A * 8/1998 Sauget ........................ 220/400
6,472,973 B1 * 10/2002 Harold et al. .............. 340/5.73

OTHER PUBLICATIONS

Product literature from Roper Box LLC catalogue (Hudson, Ohio) dated Oct. 6, 1996.

* cited by examiner

*Primary Examiner*—Michael Horabik
*Assistant Examiner*—Matsuichiro Shimizu
(74) *Attorney, Agent, or Firm*—Frank J. Bonini, Jr.; John F. A. Earley, III; Harding, Earley, Follmer & Frailey

(57) ABSTRACT

A lock box device having a unit with a pepper spray dispenser or a signal transmitter, or both, each of which can be selectively actuated or actuated simultaneously. The device allows selective discharge by a user of an irritant, such as a pepper spray, and selective actuation of a transmitter to emit a distress signal.

21 Claims, 5 Drawing Sheets

110

LOCK BOX DEVICE

CROSS-REFERENCE TO RELATED APPLICATIONS

This application claims priority from U.S. Provisional Application Ser. No. 60/169,524 filed on Dec. 7, 1999, and U.S. Provisional Application Ser. No. 60/169,994 filed on Dec. 3, 1999, the complete disclosures of which are incorporated herein by reference.

BACKGROUND OF THE INVENTION

1. Field of the Invention

The present invention relates to the field of safety and protection devices, and more particularly to lock boxes of the type commonly used in commercial and residential real estate to regulate access to a property.

2. Description of the Related Art

Lock boxes are widely used in the commercial and residential real estate businesses for providing easy access to properties so that an agent may show the property to his or her clients. A lock box is a particularly useful device in that it saves time by allowing a key to a building (or other means) to be stored within the box. The box generally has a covered opening which can be accessed by a realtor with a code, combination, master key or other element to access the key to the building. This enables the exclusion of others, except for certain designated realtors, from admittance to the building. To this effect, a realtor may bring a client to several property sites and gain access to each without having to obtain keys at a central office. For example, often commercial and residential properties are listed through different real estate agents who have different offices. The offices may be located close to each other or may be very distant. In either case, it is a nuisance for a realtor who wishes to show several properties to a client to visit each listing office in order to obtain a key. Furthermore, not only is obtaining the keys from several locations time consuming, but after the property is shown to a client, the keys must be returned. While drop boxes are established at most real estate offices for returning the keys, the process is often compounded in terms of the time taken by office personnel having to sort through a mass of keys and then organize the keys in some fashion so that the returned keys are then available to agents in the future who desire to show the properties to their clients.

The lock box generally is a device which attaches to the door, such as the door knob or handle, or some other fixed structure and contains a key which will unlock the property at which the lock box is situated. The key is maintained in the box in a secure manner so that only those authorized personnel, such as real estate agents who have obtained the combination or means to access the key in the box, are able to open the box and remove the key. Lock boxes are often constructed out of a hardened steel or other strong material which makes them difficult to force open. Furthermore, a lock box must be secure against thieves who realize that the key to a dwelling is in there and that should they succeed in opening the lock box, they will have access to the dwelling. In some cases, the house may not contain any valuables or items of the homeowner, which is usually the case when the homeowner has moved, or where commercial space has been vacated. However, at other times, the homeowner has valuables therein which make it attractive to individuals looking to steal such items.

Lock box examples and control circuitry are illustrated in the following U.S. Pat No. 4,609,780—"Electronic Secure Entry System, Apparatus and Method", issued on Sep. 2, 1986 to Keith S. Clark; U.S. Pat. No. 4,594,637—"Digital Electronic Lock System", issued on Jun. 10, 1986 to Sidney Falk; U.S. Pat. No. 4,777,556—"Solenoid Activation Circuitry Using High Voltage", issued on Oct. 11, 1988 to Mir A. Imran; U.S. Pat. No. 4,800,255—"Electronic Access Card with Visual Display", issued on Jan. 24, 1989 to Mir A. Imran; U.S. Pat. No. 4,864,115—"Electronic Access Card Having Key Pads and Coils and Combination Using the Same", issued on Sep. 5, 1989 to Mir A. Imran and Keith S. Clark; and U.S. Pat. No. 4,988,987—"Keysafe System with Timer/Calendar Features", issued on Jan. 29, 1991 to Philip D. Barrett, Walter G. Henderson and Wayne F. Larson. The complete disclosures of which are herein incorporated by reference.

While lock boxes offer an easy way to access a building in a manner which helps to secure the home and its contents, there are situations where would-be thieves will try to circumvent a lock box. Realtors showing properties, are particularly vulnerable. Often the realtor does not know the client, who may have simply called the realtor and indicated he or she wishes to look at a particular property. In many cases, it is not practical for more than one realtor to show a property and, as is often the case, a single realtor may meet an individual at a location and show one or more properties. In some cases, a would-be thief, posing as a client, may simply accompany the realtor to the property and memorize or obtain the combination to the lock box. The A would-be thief knowing the combination may then return when the realtor is not present to gain unauthorized access to the property through the combination which he or she obtained.

However, there are those situations where the realtor may be placed in danger and can be the victim of a criminal act. Incidents of violence such as rapes, batteries, assaults against realtors when showing a property to a client have been known to occur. Often, in these cases, individuals pose as clients with no real intention to purchase the property, but only to carry out acts against the realtor. In order to use a lock box, the realtor must arrive at the property and enter a code or combination to open the lock box. This enables the realtor to gain access to the key stored in the lock box which can be used to unlock the door. Once the lock box is opened, the realtor, after using the key to open the door, will generally hold the key in his or her possession until the completion of the showing of the property to a client. Most lock boxes provide a detachable face or key carrier which detaches from the portion of the lock box held on the door when the box is opened. In many cases, the realtor will carry this portion of the lock box while showing the house. It is a common practice to attach the key to a chain, and in many cases, to the removable portion of the lock box so that the key and removable portion will remain together to be carried by the realtor.

Often, the realtor does not know the client and proceeds to meet with and show the client a property, usually with no one else present. While it is impractical for a realtor to carry a weapon, as legitimate clients may be frightened by this practice, the realtor may have a cell phone to call for help in an emergency situation. However, this may not provide a fast enough response should the individual to whom the property is being showed attempt to use force or violence against the realtor.

While current lock boxes provide a way to secure a property against unauthorized access, the lock box does not protect the realtor, and rather can actually make the realtor a potential target since those who would desire to commit criminal acts might see the lock box as an opportunity.

A need, therefore, exists to provide a lock box with a security feature which will aid to protect realtors in situations where the client threatens harm or other acts which must be defended directly and immediately, before any other help can arrive.

SUMMARY OF THE INVENTION

The present invention provides a lock box device which can assist to protect an individual in situations where the individual is threatened with impending harm or fears for his or her safety. A lock box device in a preferred embodiment is provided with the ability to issue a distress signal which can be picked up and responded to by appropriate individuals. The lock box device in another preferred embodiment, comprises a replaceable cartridge containing an irritant, such as pepper spray, which can be actuated with the hand of an individual by pressing to cause a release of a stream of pepper spray. In yet another preferred embodiment of the lock box device, a pepper spray cartridge and a transmitter are provided.

Lock boxes generally have a body with a removable cover or insert. In many cases, the key is stored in the body or insert, or can be chained to the insert so that when the insert or cover is removed the individual can carry it with the key. In one embodiment according to the present invention, the lock box device comprises a replaceable insert cartridge which is installed in the removable cover of a lock box. This enables the user of the lock box, such as a realtor, to carry the armed pepper spray cartridge with the key when showing the property. In addition thereto, or alternately, a transmitter may be included in the insert or removable cover portion the lock box. The transmitter device can be provided with a button or other actuator which can be depressed at any time by the realtor while carrying it during the showing of the property. The present invention may provide a transmitting device, a pepper spray cartridge or both. In a particularly preferred embodiment, the lock box device includes a transmitter and a pepper spray cartridge.

It is an object of the present invention to provide a lock box device having safety features, and which can store a key to a property therein.

It is another object of the present invention to accomplish the above object where the lock box device has a wireless transmitter for emitting a distress signal of actuation.

It is another object of the present invention to accomplish the above objects where the lock box device had a cartridge containing a pepper spray which can be actuated to selectively release pepper spray in situations of distress.

It is a further object of the present invention to accomplish the above objects where the transmitter and/or pepper spray cartridge is discretely provided.

It is another object of the present invention to provide a lock box device which has a transmitter which can be actuated to transmit a signal to a receiver at a location remote from the transmitter.

It is a further object of the present invention to provide a lock box device which has a transmitter and a pepper spray cartridge each of which can be separately actuated, or simultaneously actuated.

It is another object of the present invention to provide a lock box device which has selectively attachable safety features, including a pepper spray cartridge, a transmitter, or both.

BRIEF DESCRIPTION OF THE PREFERRED EMBODIMENTS

DETAILED DESCRIPTION OF THE PREFERRED EMBODIMENTS

Figure 1:
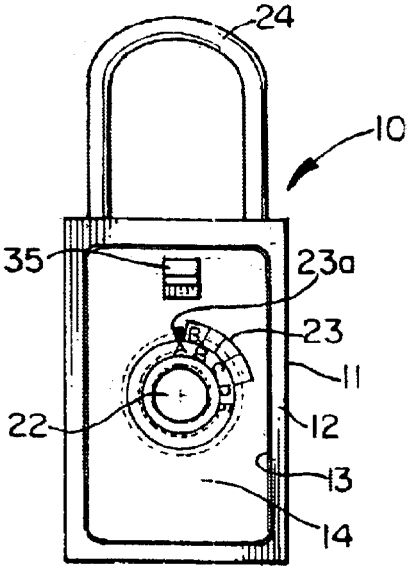
FIG. 1 is a front elevation view of a lock box device according to the present invention.
Figure 2:
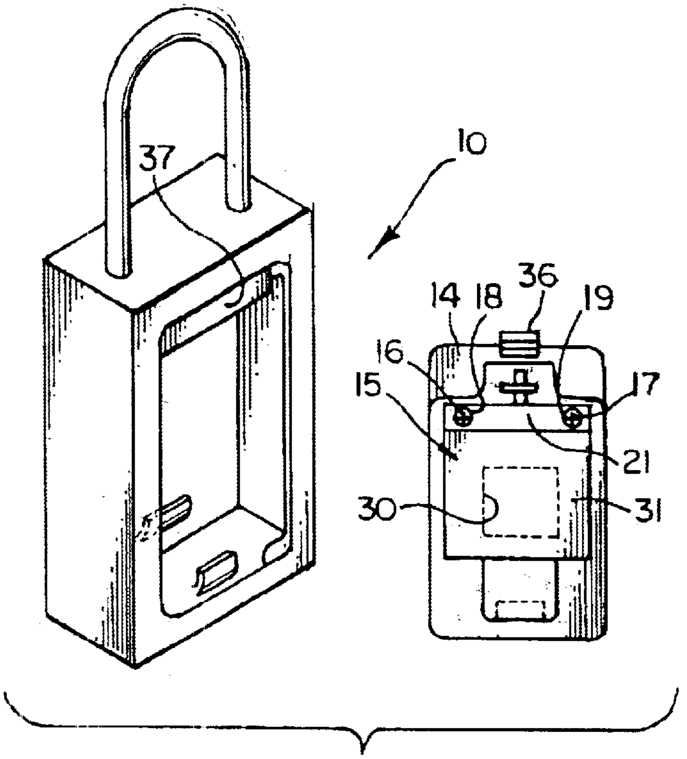
FIG. 2 is a perspective view of the lock box device of FIG. 1, displayed with the front panel removed.
Figure 4:
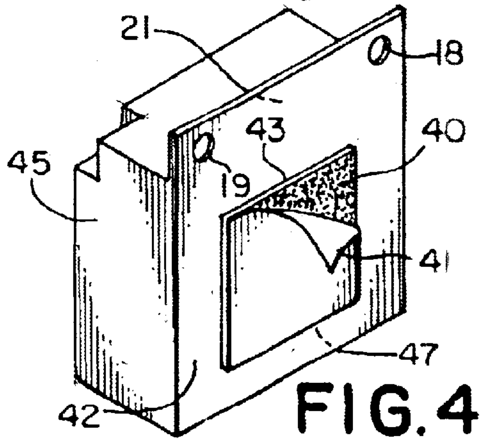
FIG. 4 is a perspective view of the unit of the lock box device shown in FIG. 3, looking at the rear of the unit.

Reference now being made to the drawings, there is shown a lock box device constructed in accordance with the present invention. FIG. 1 shows a lock box 10 with security means. The lock box 10 has a body portion 11 with a front wall 12 having an opening 13 therein. A face plate 14 is provided to attach to the body portion 11 and cover the lock box opening 13. In a preferred embodiment shown in FIG. 2, the security means comprises a unit 15 which contains an irritant that can be selectively emitted. The unit 15 has actuation means for selectively actuating the release of the irritant. Attachment means is provided to attach the unit 15 to the rear face 16 of the lock box face plate 14. The attachment means can comprise any suitable means for attaching the unit 15 to the face plate 14, such as the screws 16, 17 which extend through apertures 18, 19, respectively provided in a mounting tab 21 of the unit 15 to secure the unit 15 to the face plate 14. The attachment means, while shown in a preferred embodiment comprising screws 16, 17, alternately, as shown in FIG. 4, can comprise an adhesive, such as a self-sticking adhesive 40 which is preapplied to the rear wall 42 on a paper, pad or the like 43 (which itself can be adhered to the surface of the unit's rear wall 42, and contains a removable backing 41.

As shown in FIG. 1, the face plate 14 has a locking mechanism of the type commonly known and used in the art for securing lock box panels, such as the face plate 14, to a box body portion 11. For example, a dial type combination lock mechanism can be used, as is shown in FIG. 1, where a dial 22 is rotated in a particular manner, stopping at predetermined points, to open a lock of the locking mechanism and thereby permit release of the face plate 14 from the body portion 11. Indicia, such as letters, numbers or the like 23 is generally provided on the face plate near the dial 22 and an arrow 23*a* on the face plate 14. An attachment bar 24 is provided to secure the lock box body 11 to a door knob (not shown) in the manner known to those in the art. A latch 35 is provided on the face plate 14 for retracting a pawl 36 of the face plate from a keeper 37 provided on the lock box body portion 11. The combination-type locking mechanism shown herein is widely used and commercially available. The latch 35 can be released when the correct combination is entered through the rotation of the dial 22 to predetermined stops (usually coinciding with a series of three letters, accomplished through a first clockwise rotation to a first letter, a second counterclockwise rotation past the first letter to a second letter, and a third clockwise rotation to a third letter).

Figure 3:
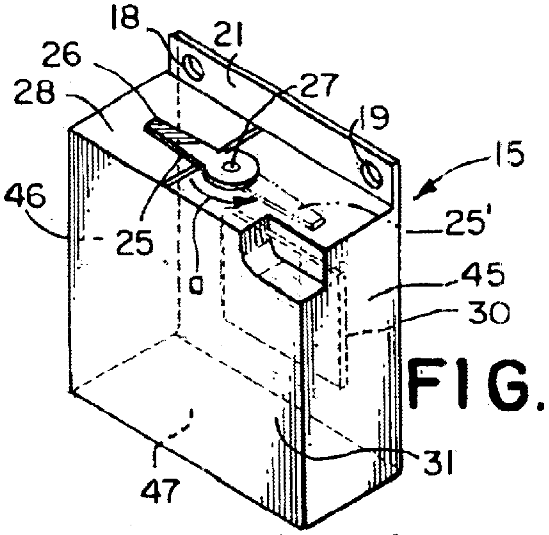
FIG. 3 is a perspective view of the unit of the lock box device shown in FIGS. 1 and 2, looking at the front of the unit.

Referring to FIG. 3, the unit 15 is shown with the actuating means comprising a depressible tab 25 which can be operated by pressing the end 26 of the tab 25 to release the contents of the unit 15 through an opening or nozzle 27. Safety means is provided to prevent the accidental release of the unit's contents. The safety means is shown comprising a shelf 28 which is positioned to interfere with the tab 25 so that the tab 25 cannot be depressed when positioned over the shelf 28. The tab 25 is pivotally provided on the unit 15 to be pivoted in the direction indicated by arrow "a", from a first position where it cannot be depressed, to a second position, where the tab 25' shown in broken-line representation can be depressed. The safety means prevents unintentional release of the unit contents, such as, for example, when a person is removing the face plate 14 from the lock box 10.

Label means for identifying unit contents is provided. The label means comprises a label 30 containing indicia of the unit contents and preferably is affixed to the front wall 31 of the unit 15. The label 30 may contain a warning, expiration date, or other information.

The unit 15 comprises sealed container means for sealingly containing the unit contents, such as a pepper spray, therein. The container means can comprise the walls of the unit 15, including the front wall 31, the rear wall 42, the first side wall 45, second side wall 46, bottom wall 47, and top wall 48. Preferably, the unit 15 is comprised of a composition which will not be corroded by the unit contents. After the unit 15 has been actuated, and the contents released or spent, the unit 15 can be removed from the face plate 14 and a new unit 15, which contains fresh content, such as the pepper spray installed thereon. Alternately, the unit 15 can receive a canister or cartridge (not shown) which can be held within the unit 15, and can be replaced as needed. Preferably, the cartridge can contain the actuator 25 which can be rotated by the user, as described above, to a depressible, operable position 25'.

While the unit contents have been referred to herein as pepper spray, it is understood that the contents of the unit 15 can comprise other commercially obtainable, non-lethal irritants, consistent with the principles of the invention as described herein. Preferably, the unit 15 can contain pepper spray which is under pressure, such that when the tab 25 is actuated, a seal is broken and the pepper spray released through the opening or nozzle 27.

Figure 5:
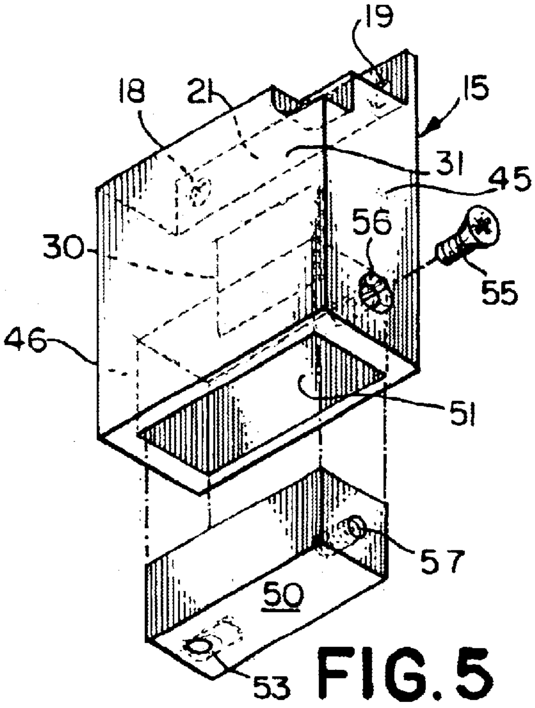
FIG. 5 is a perspective view of the unit of the lock box device shown in FIGS. 3 and 4, as viewed to show the bottom of the unit and the transmitter.

Referring to FIG. 5, the security means can alternately, or additionally, comprise an alerting device, such as, for example, a wireless transmitter 50. The transmitter 50 is provided with circuitry of the type commercially available and known to those having skill in the art, to emit a signal when actuated by a user. The transmitter 50, preferably, can be any of those which are commercially available and known in the art which produce a signal upon actuation by a user, and where the signal is picked up by a receiving unit (not shown) which, for example, is connected to a phone line and programmed to automatically dial a number, such as an emergency number (911), or another predetermined, preprogrammed number, when a signal from the transmitter 50 is received. The receiver can have its own power supply such as a rechargeable battery, and/or an electrical power supply which can be plugged into an outlet. The receiver also connects to a phone jack so that it has access to the phone line when the signal from the transmitter is emitted. Alternately, the receiver can be preprogrammed to dial a monitoring station or some other location where the call will alert others to the receiver's location and will provide an opportunity for others to send help.

Furthermore, alternately, or in addition to the receiver, the transmitter 50 can be a transmitter which can provide a signal to a satellite for direct transmission from the satellite to a monitor at a location off of the property site. For example, the signal emitted from the transmitter 50 can be sent via satellite to be received at a location remote from the transmitter 50, such as a monitoring station, where an appropriate response can be undertaken by those receiving the signal, such as summoning police or proceeding to the location to assist the individual who issued the signal. In addition, the signal generated may be coupled with a global positioning system, either provided in the transmitter or some other remote location, where the exact location of the distress signal emission can be pinpointed to aid those coming to the aid of the user who issued the signal.

The unit 15 preferably carries the transmitter 50. The unit 15 has an area, such as a slot 51 formed therein, in which the transmitter 50 can be carried. Suitable means for retaining the transmitter 50 on the unit can be employed, and can comprise a flexible rubber gasket, screws, compression elements, and the like. A screw 55 is shown for insertion into a threaded bore 56 provided in the side wall 45 of the unit 15 and to secure to a threaded bore 57 of the transmitter 50.

Actuation means is provided for actuating the transmitter 50 when the user desires to send an alert signal. The actuation means can comprise a button 53 on the unit which, when depressed, will cause the emission of a signal. The button 53 can be located in a recess so as to minimize the potential for accidental actuation. The transmitter 50 preferably contains its own power source, such as a battery (not shown), which can be incorporated into the circuitry. The battery can be a long-lasting energy cell or a rechargeable battery unit. Any suitable known signal generating components, such as those commercially available and known for producing a signal which can be remotely monitored, can be used. The actuation means associated with the transmitter 50 can be separately provided, or alternately, or additionally can be joined with the actuating means controlling the release of the pepper spray from the unit 15, so that when the pepper spray is released, a signal is also emitted by the transmitter 50.

Figure 6:
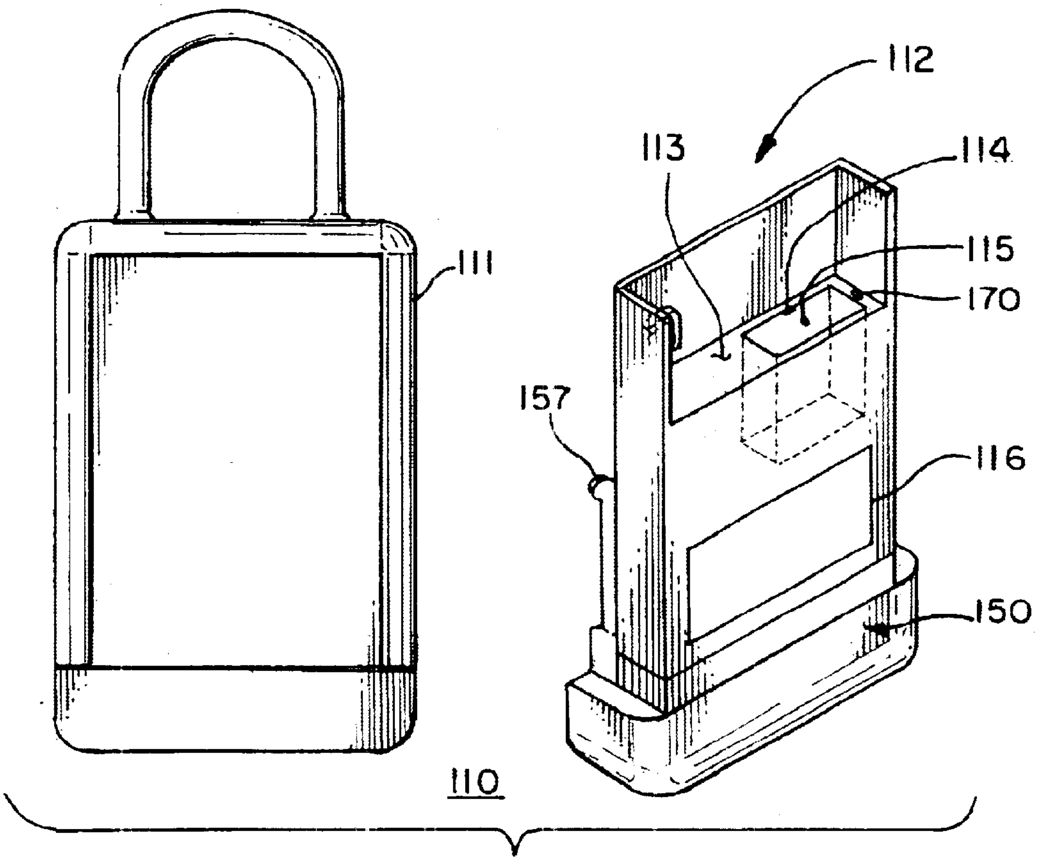
FIG. 6 is a second alternate embodiment of a lock box device according to the present invention.

Referring to FIG. 6, a second alternate embodiment of a lock box device is shown constructed in accordance with the present invention. A lock box 110 has a body portion 111 with a removable insert 112 which has a space 113 therein for storage of a key. The lock box 110 has security means. Preferably, the lock box insert 112 carries the security means. The insert 112 carries a unit 114 which can dispense a pepper spray from a nozzle or opening 115. The lock box device has actuation means for selectively actuating the release of the pepper spray from the unit 114. Labeling means is placed on the insert for identifying the contents of the insert, and displaying other indicia, such as expiration dates, warnings and the like. The labeling means can comprise the label 116 placed on the front of the insert 112 or the lable 116*a* placed on the unit 114 (FIG. 8).

Figure 7:
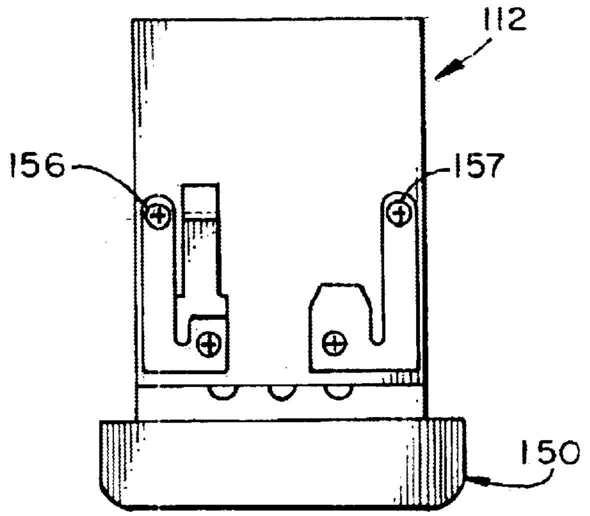
FIG. 7 is a rear elevation view of the insert shown in FIG. 6, shown in a separate view.

The security means can alternately, or additionally, comprise an alerting device, such as, for example, a wireless transmitter 150, provided to operate in the manner described above in connection with the transmitter 50. The transmitter 150 has circuitry for emitting a distress signal when actuated by a user. The transmitter 150 is preferably carried by the insert 112, and, as shown in FIG. 6, is connected to the bottom of the insert 112. The lock box body 111 can be elongated to accommodate the transmitter 150 and a slot can be provided in the insert 112 in which the transmitter 150 can be disposed. Preferably, however, as shown in FIGS. 6 and 7, the transmitter 150 can be attached to extend from the bottom of the insert 112. As shown in FIGS. 6 and 7, the insert 112 extends beyond the bottom of the body 111. The transmitter 150 can be housed in a false bottom 155 which can provide the lock box with the appearance of being a longer single unit. Suitable means for retaining the transmitter 150 on the insert can be employed, and can comprise a flexible rubber gasket, screws, compression elements, or the like. Preferably, the transmitter 150 is attached to the insert 112 so that when the insert 112 is secured to the lock box body 111, the transmitter 150 will be secured as well. Retaining means such as those known which are used to secure an insert 112 of a lock box 110 to a lock box body 111, such as the mounting posts 156, 157, can be employed. The retaining means can be unlatched when the proper combination is entered in the locking mechanism to release the insert 112 from the lock box body 111. The locking mechanism, while not shown, is understood to comprise any of the locking mechanisms which can be used to secure lock boxes, such as those commercially available mechanisms. The signal emitted from the transmitter 150 can be received at a location remote from the transmitter 150, such as a monitoring station, where an appropriate response can be undertaken by those receiving the signal, such as summoning police or proceeding to the location to assist the individual who issued the signal. Actuation means is provided for actuating the transmitter 150 to cause it to emit a distress signal. The actuation means can comprise a button 170 disposed on the insert 112 which can be selectively depressed by a user when needed. Preferably, the button 170 is disposed in a location on the insert which requires access to the key, in order to prevent unauthorized or accidental actuation of the transmitter 150. While not shown, it will be understood that a safety catch can be provided to interfere with the button 170 to prevent accidental actuation. The safety catch, while not shown, can comprise a rotatable collar such as those known in the art and commercially available, which is associated with the button 170 to hold it from being depressed, until the catch is rotated to a predetermined position.

Figure 8:
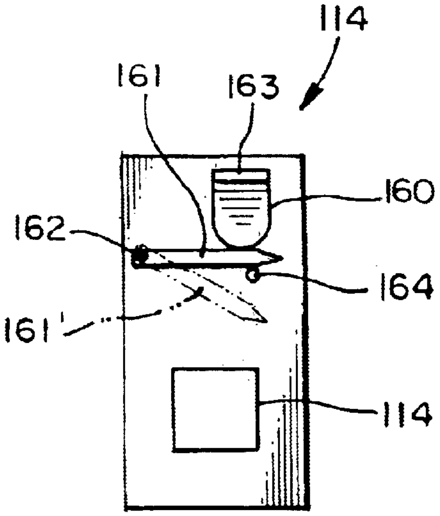
FIG. 8 is a front elevation view of the pepper spray unit of FIG. 6, shown in a separate view.

The actuation means for actuating the release of the pepper spray preferably comprises a button 160 as shown in FIG. 8, which can be operated by the thumb of a user. Safety means comprising a safety release lever 161 is pivotally mounted to the cartridge 114 with a suitable pivot member, such as the pivot screw 162. The lever 161 interferes with the button 160 in one position and when pivoted to a second position 161' permits the button 160 to be depressed to release pepper spray from the nozzle 163. A stop 164 is provided on the cartridge 114 to maintain the lever 161 in an interfering position with the button 160, until selectively released by moving the lever 161 over the stop 164. The cartridge 114 is configured for positioning within the insert 112, as shown in FIG. 6.

Figure 9:
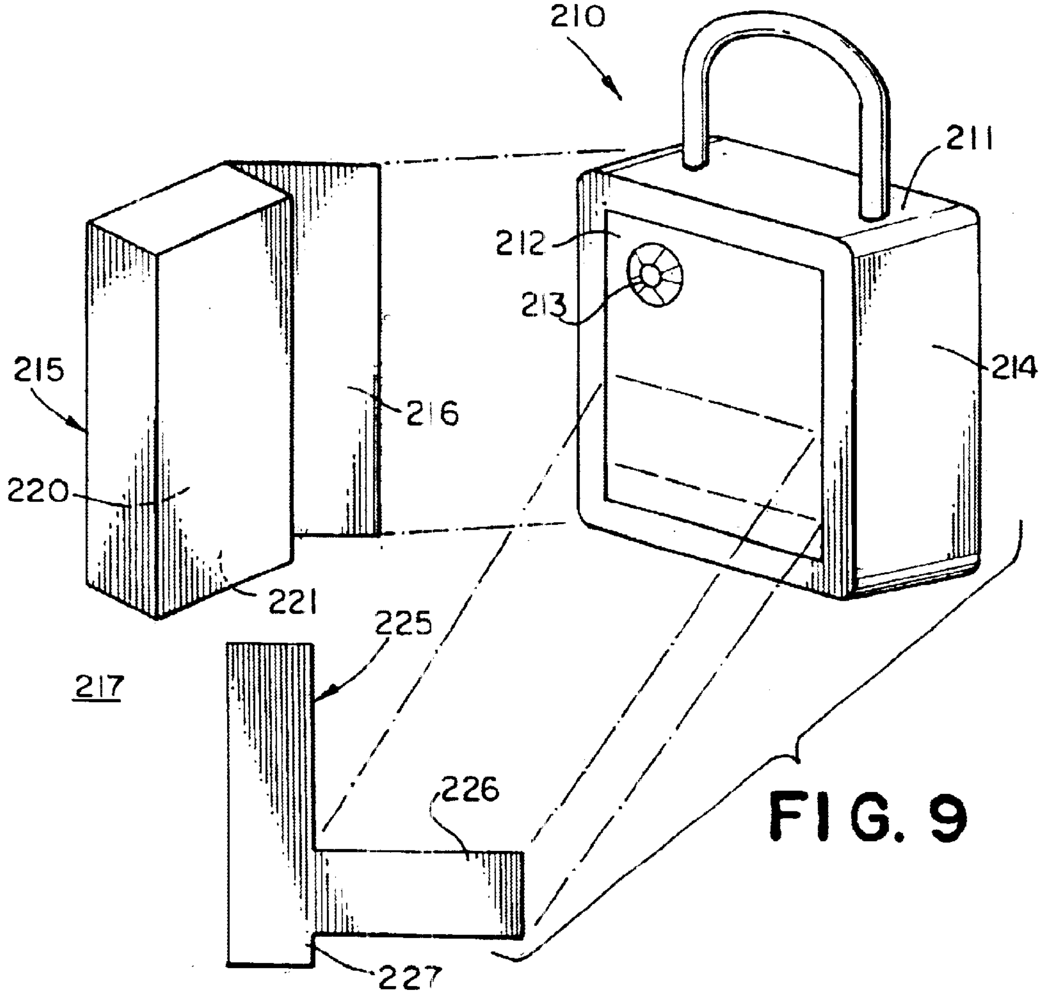
FIG. 9 is a third alternate embodiment of a lock box device according to the present invention shown in an exploded view.

Referring now to FIG. 9, a lock box device 210 according to the present invention is shown comprising a lock box 211 with a body 214, a front cover 212 and a locking mechanism 213 for securing the front cover 212 to the lock box body 214. The lock box 211 functions similar to the lock boxes described herein. Adapter means is shown for holding pepper spray and/or a transmitter unit on the lock box 211. The adapter means preferably comprises an adapter 217 having a first adapter element 215 for attachment to the lock box 211 with suitable securing means such as the double sided tape 216 shown in FIG. 9. Preferably, the first adapter element 215 of the adapter means has a storage space 220 therein with an opening 221 at one end thereof. The storage space 220 is used to store a pepper spray unit (not shown) therein as well as an optional transmitter, which can also be contained therein. The adapter means further comprises a second adapter element 225 which has a connecting portion 226 for connecting to the removable cover 212 of the lock box 211. The second adapter element 225 further has covering means for covering the opening 221 of the storage space 220 of the first adapter element 215. Preferably, the covering means comprises a flange 227 disposed on the second adapter element 225 which is positioned over the opening 221 of the first adapter element 215 when the second adapter element 225 is installed on the lock box front cover 212 and the lock box front cover 212 is closed and connected to the lock box body 214. Similarly, when the lock box front cover 212 is removed from the lock box body 214, the second adapter element 225 is removed therewith to expose the opening 221 of the first adapter element and thereby permit access to the pepper spray unit and the transmitter, or other items contained in the storage space 220. While double sided tape 216 is shown for attaching the first adapter element 215 to the lock box 211, it will be understood that screws, bolts, rivets, adhesive, or like suitable fastening means can also be employed to secure the first adapter element 215 to the lock box 211. Also, the second adapter element 225 can be secured to the lock box cover 212 with suitable attachment means, such as screws, rivets, adhesive, double sided tape, and the like.

Figure 10:
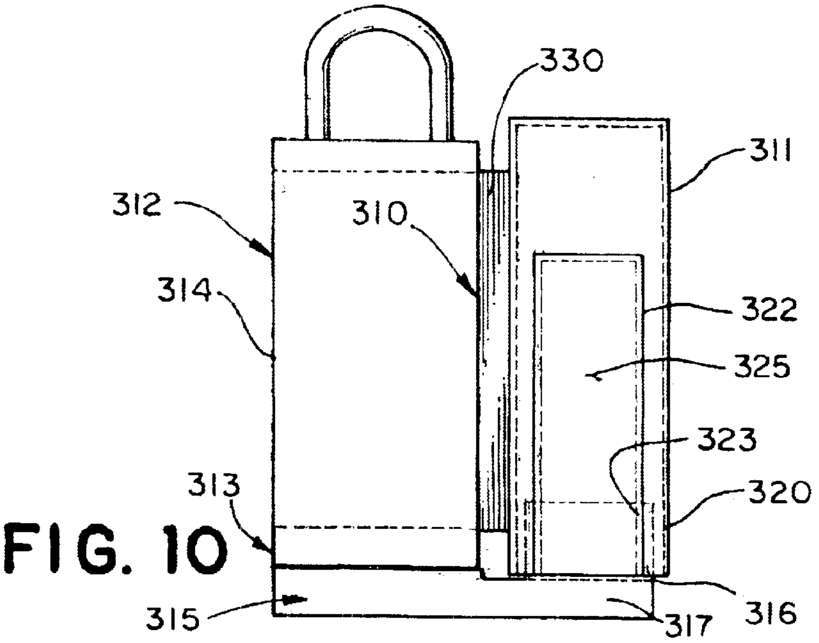
FIG. 10 is a front elevation view of a fourth alternate embodiment of a lock box device according to the present invention.
Figure 11:
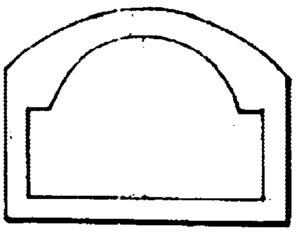
FIGS. 11–16 are separate views showing the components of the lock box device embodiment of FIG. 10.
Figure 12:
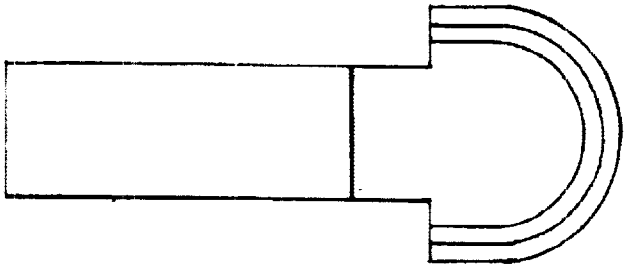
Figure 14:
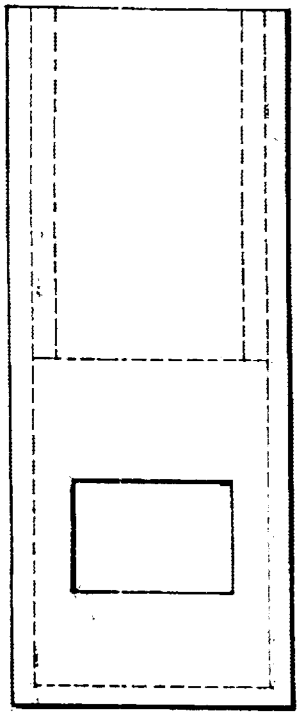
Figure 15:
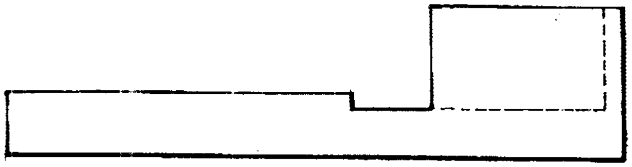
Figure 13:
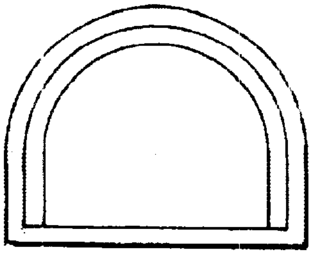
Figure 16:
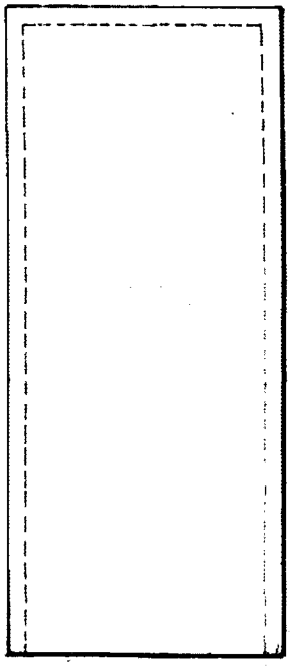

Referring now to FIG. 10, another alternate embodiment of a lock box device according to the present invention is shown comprising an adapter 310 with a first adapter element 311 and attachment means for attaching the adapter body portion 311 to a lock box, such as, for example, the lock box 312 which can be the type shown in FIG. 6, above, where the bottom portion 313 of the lock box 312 is removably provided to be maintained in a locked position and opened to be released from the lock box body 314. The lock box 312 pictured in FIG. 10 can comprise any lock box which has a bottom opening feature such as the removable bottom portion 313 which releases from an end, here the bottom of the lock box body 314, to permit access to a key stored in a storage cavity of the body 314. The adapter further has a cover element 315 which is secured to the removable lock box bottom portion 313 with screws, rivets, tape, adhesive or other suitable attachment means. The cover element 315 has a plug portion 316 which extends upwardly from the base 317 of the cover element 315. The first adapter element 311 has a bore 320 therein to receive the socket portion 316 of the cover element 315. An insert 322 is provided and is carried within the inner wall 323 of the socket portion 316 of the cover element 315. The insert 322 can comprise a hollow body with a space 325 therein for storing items, such as pepper spray and/or a transmitter. The storage space 325 is enclosed and access to the storage space 325 is restricted until the cover element 315 is lowered with the removable cover element 313 of the lock box 312.

Preferably, the first element or body 311 of the adapter is attached to the lock box 312 with suitable attachment means, such as the tape 330 shown in FIG. 10. While not shown, it is understood that the first adapter element 311 can be integrally formed with the lock box body 314. The first adapter element 311 is maintained on the lock box 312 at all times, whereas the cover element 315 is provided to be lowered with the lock box removable portion 313. When the cover element 315 is lowered, the socket portion 316 is lowered out of the bore 320 of the first adapter element 311 and the insert 322 lowered therewith. The insert 322 is thereby removed from the first element 311 and can be lifted off of the socket portion 316 of the cover element 315 so that the insert space 325 may be accessed so that the contents stored therein can be used. FIGS. 11 through 16 further show different views further illustrating the lock box device according to the present invention.

Figure 17:
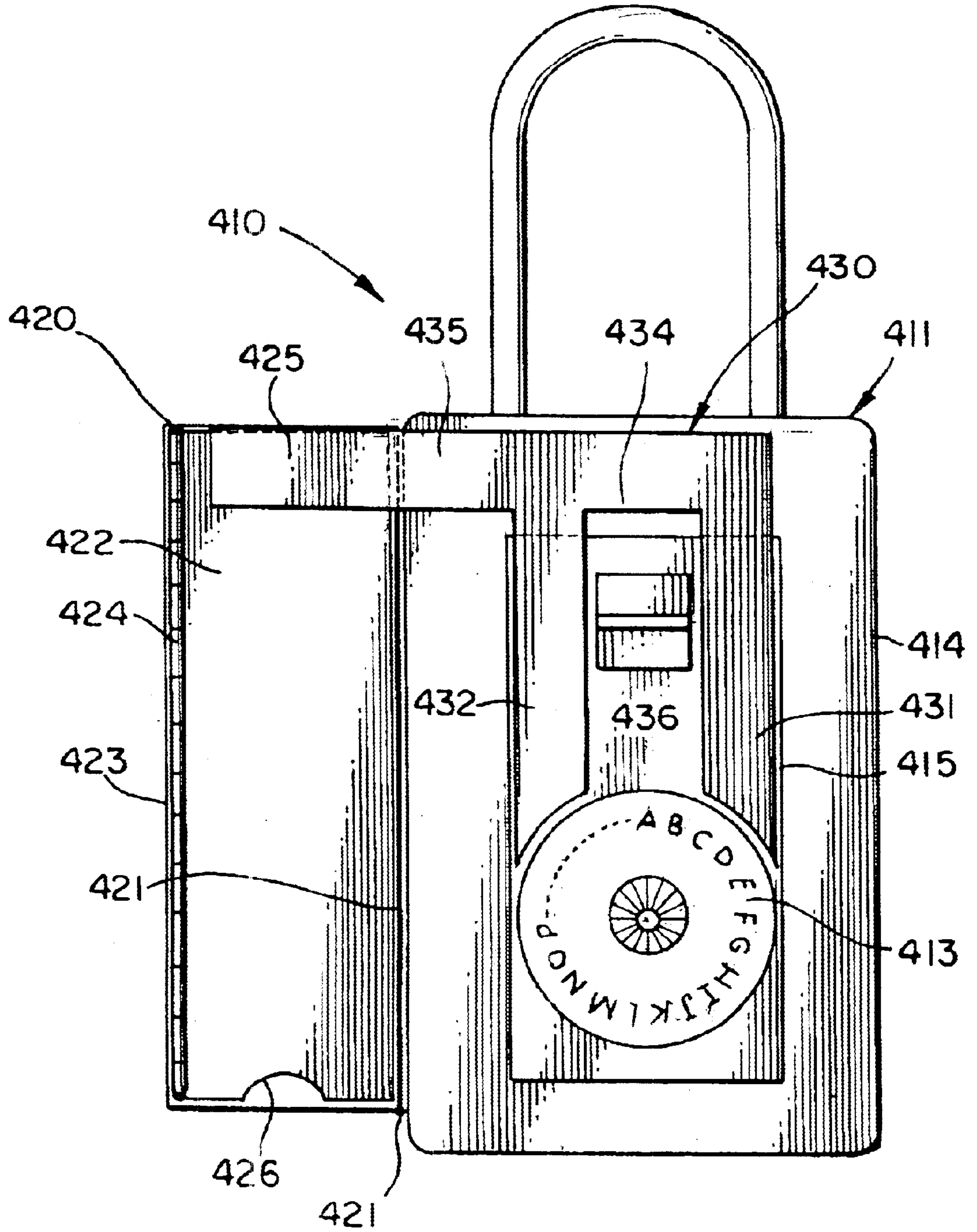
FIG. 17 is a front elevation view of a fifth alternate embodiment of a lock box device according to the present invention, shown with the lock box cover attached and the locking member in the locked position.

Referring now to FIG. 17, an alternate embodiment of a lock box device 410 according to the present invention comprising a lock box 411 with a body 414, a front cover 415 and a locking mechanism 413 for securing the front cover 415 to the lock box body 414. The lock box 411 functions similar to lock boxes described herein. The lock box device 410 has security means for facilitating the protection of an individual. The security means is shown comprising a container 420 attached to the lock box body 414 on one side thereof with suitable securing means. The securing means can comprise a strip of double-sided adhesive tape 421 or can comprise any other suitable means for attaching the container 420 to the lock box body 414. While not shown, it is understood that the container 420 can be integrally formed with the lock box body 414. The container 420 preferably has a removable door 422 which is shown swingably attached to the container body portion 423 with hinge means, such as hinge 424. The hinge 424 holds the door 422 on the container body 423 and, preferably is provided with finger recesses 425, 426 on each opposite end of the door 422 for facilitating opening of the door 422 with the user's fingers or thumbs. The security means of the lock box device embodiment 410 further comprises a locking member 430 for locking the door 422 in a closed position in relation to the container body 423. The locking member 430 has attachment means which can comprise mounting flanges 431, 432 for mounting the locking member 430 onto the front cover 415 of the lock box 411. The locking member also has a body 434 which connects the mounting flanges 431, 432 with a locking arm 435 which extends over the door 422 and prevents the door 422 from being opened.

The lock box 411 can be of the type that has a button mechanism 436 which can be depressed, and when the correct combination has been entered in the locking mechanism 413, causes the release of the front cover 415 from the lock box body 414. The release of the front cover 415 also removes the locking member arm 435 out of the way of the door 422 so that the door 422 may be opened. The locking member 430 is attached to the front cover 415 and is removed therewith when the front cover 415 is detached from the lock box body 414.

While double sided tape has been shown to secure the container 420 to the lock box body 414 and the locking member mounting flanges 431, 432 to the front cover 415, it will be understood that any suitable attachment means, such as screws, rivets, bolts adhesive or the like, can be used consistent with the principles of the resent invention. It will be further understood that the attachment can be accomplished by integrally forming the locking member arm 435 and front cover 415.

These and other advantages of the present invention are provided, and the invention is to be broadly construed in accordance with the Background of the Invention, the Summary of the Invention, the Brief Description of the Drawing Figures, the Detailed Description of the Preferred Embodiments and the appended claims.

What is claimed is:

1. A real estate lock box device comprising:

(a) a real estate lock box having a body portion with a cavity therein and at least one opening into said cavity;

(b) a cover which is removably provided to selectively cover said opening;

(c) locking means for locking said cover in position over said opening; and (d) an irritant dispensing unit provided on said cover for facilitating the protection of an individual.

2. The device of claim 1, wherein said irritant dispensing unit contains an irritant which is selectively dischargeable, and actuation means for triggering the release of said irritant.

3. The device of claim 2, wherein said irritant comprises pepper spray.

4. The device of claim 2, further comprising transmission means for transmitting a signal.

5. The device of claim 4, further comprising monitoring means for monitoring the signal transmitted from said transmission means.

6. The device of claim 4, wherein said transmission means comprises a transmitter.

7. The real estate lock box device of claim 1, wherein said irritant dispensing unit is adapted for mounting to a the lock box, and wherein the device further comprises a transmitter for emitting a distress signal from the location of the lock box to a remote location, and actuation means for selectively actuating said transmitter to emit a distress signal from the location of the lock box to a remote location, said transmitter being carried by said device.

8. The device of claim 7, further comprising monitoring means for monitoring the distress signal transmitted from said transmitter.

9. The device of claim 7, further comprising receiver means for receiving the distress signal transmitted from said transmission means.

10. The lock box device of claim 7, wherein said irritant dispensing unit comprises a pepper spray dispenser.

11. A real estate lock box device for use with a real estate lock box, said real estate lock box device comprising:

(a) container means for containing an irritant;

(b) mounting means for mounting said container means to a removable component of a real estate lock box; and (c) actuation means for selectively actuating the release of the irritant from said container means.

12. The device of claim 11, further comprising safety means for facilitating the inadvertent release of the irritant from the container means.

13. The device of claim 11, further comprising transmission means for transmitting a signal.

14. The device of claim 13, further comprising received means for receiving the signal transmitted from said transmission means.

15. The device of claim 13, further comprising monitoring means for monitoring the signal transmitted from said transmission means.

16. The device of claim 13, wherein said transmission means comprises a transmitter.

17. The device of claim 11, which is adapted for use with a lock box having a body portion and a removable cover, wherein said device is adapted for mounting to a removable cover of a lock box.

18. The device of claim 12, wherein the actuation means comprises an actuator, and wherein said safety means comprises a movable lever positionable between a first position which interferes with the actuator to prevent actuation and a second position which does not interfere with the actuator.

19. The device of claim 11, wherein said container means comprises a replaceable canister containing an irritant therein.

20. The device of claim 19, wherein said irritant comprises pepper spray.

21. A real estate lock box device comprising:

(a) a real estate lock box having a body portion with a cavity therein and at least one opening into said cavity;

(b) a cover which is removably provided to selectively cover said opening;

(c) locking means for locking said cover in position over said opening;

(d) adapter means comprising a first element which is adapted to be fixedly mounted to the lock box body portion, and a second element which is mounted to the cover and is removable therewith;

(e) wherein said first element has a storage space therein; and (f) wherein said second element is disposed to cover said storage space when said cover is installed on the lock box body portion, and to uncover said storage space when said cover is removed from the body portion; and a pepper spray dispenser provided in said storage space of said adapter means.

* * * * *